US006392381B1

(12) United States Patent
Chen

(10) Patent No.: US 6,392,381 B1
(45) Date of Patent: May 21, 2002

(54) RECHARGEABLE POWER SUPPLY PACK FOR HAND TOOLS

(75) Inventor: Ruey-Zon Chen, Taichung Hsien (TW)

(73) Assignee: Rexon Industrial Corp., Ltd., Taichung Hsien (TW)

( * ) Notice: Subject to any disclaimer, the term of this patent is extended or adjusted under 35 U.S.C. 154(b) by 0 days.

(21) Appl. No.: 09/924,459

(22) Filed: Aug. 9, 2001

(51) Int. Cl.⁷ .............................................. H01M 10/46
(52) U.S. Cl. ...................................................... 320/111
(58) Field of Search ................................ 320/107, 111, 320/112, 113, 114, 115; D13/103, 107, 108; 307/150; 429/96–100

(56) References Cited

U.S. PATENT DOCUMENTS

| 5,459,389 A | * | 10/1995 | Fujiwara et al. ............. 320/111 |
| 5,525,888 A | * | 6/1996 | Toya ........................... 320/111 |
| 5,635,814 A | * | 6/1997 | Afzal et al. .................. 320/111 |
| 5,834,919 A | * | 11/1998 | Liu .............................. 320/111 |

* cited by examiner

Primary Examiner—Edward H. Tso
(74) Attorney, Agent, or Firm—Bacon & Thomas, PLLC

(57) ABSTRACT

A rechargeable power supply pack for hand tools includes a box having an adapter and a plurality of rechargeable batteries received in received therein. A recess is defined in a bottom of the box for two terminal plates pivotably received therein. Another recess is defined in a top of the box so that the tool is engaged with the recess and electrically connected to the contact port of the batteries.

3 Claims, 7 Drawing Sheets

RECHARGEABLE POWER SUPPLY PACK FOR HAND TOOLS

FIELD OF THE INVENTION

The present invention relates to a rechargeable power supply pack connected to a hand tool and includes an adapter received therein so as to be directly plugged in the receptacles without using cables.

BACKGROUND OF THE INVENTION

Conventional hand tools generally has a cable connected thereto which is able to connected to a receptacle on walls so as to provide electric power to the tools. However, the cable has a fixed length so that the tool cannot reach to a position where is located far away from the wall if the cable is not long enough. Besides, the cables could tangle the users or the people passing by. Although some tools have equipped with a rechargeable power supply pack which is connected to the end of the handle of the tools, the pack has to be connected with an adapter which meets the specification of the pack. Therefore, the users have to carry the adapter with them so as to recharge the pack when the power is out. This is inconvenient for the users and the separated adapter could be damaged or missed.

SUMMARY OF THE INVENTION

In accordance with one aspect of the present invention, there is provided a rechargeable power supply pack for hand tools and comprises a box having a first recess defined in a top thereof for being engaged with the tools. An adapter is received in the box and has a first contact port. A plurality of rechargeable batteries are received in the box and electrically connected to the adapter. A second recess is defined in a bottom of the box and two terminal plates are pivotably received in the second recess. The two terminal plates are connected to the first contact port when the terminal plates are pivoted out from the second recess. A second contact port is connected to the batteries and located in the first recess.

The primary object of the present invention is to provide a rechargeable power supply pack for hand tools wherein an adapter and rechargeable batteries are received in the pack so that the pack can be plugged in the receptacle by its terminal plates to be charged.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
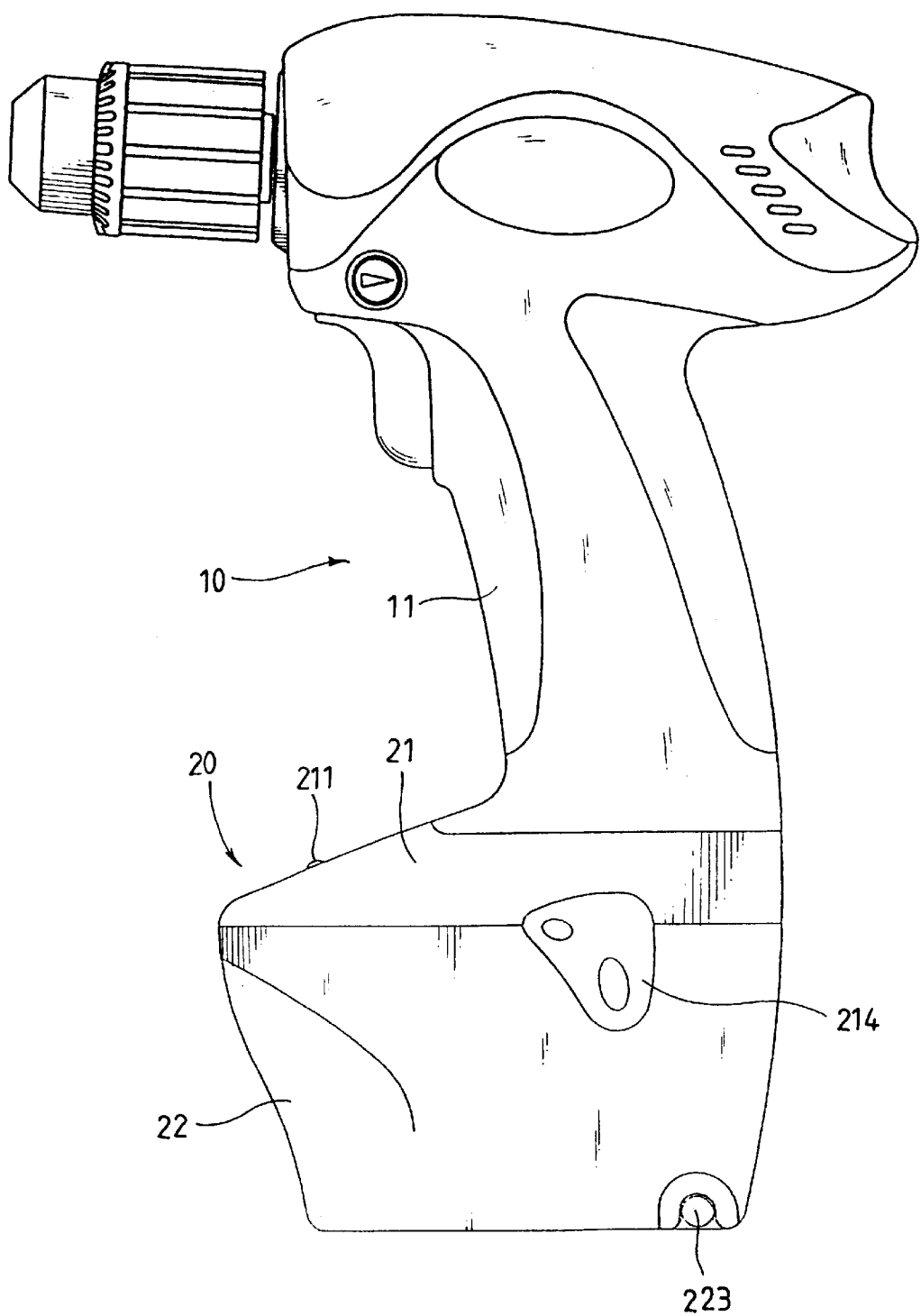
FIG. 1 is a side view to show the rechargeable power supply pack of the present invention is connected to an engaging device on a hand tool.
Figure 2:
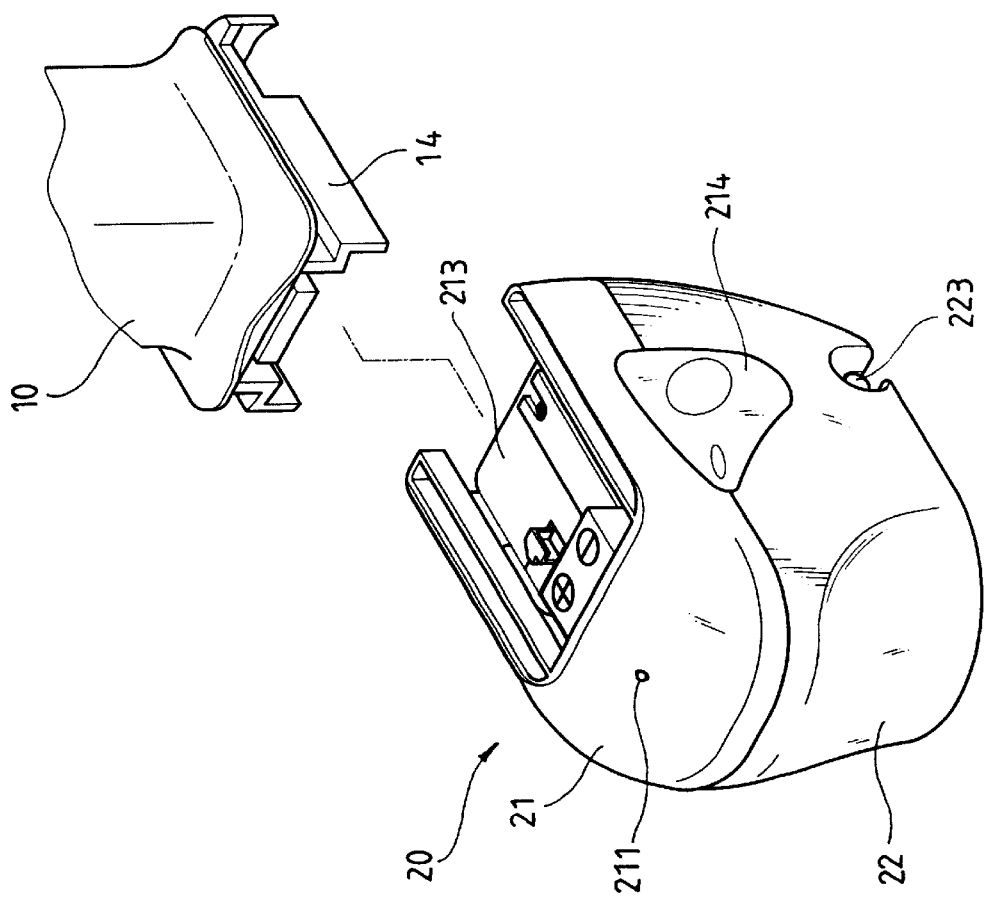
FIG. 2 is an exploded view to show the rechargeable power supply pack of the invention and the handle of the tool.
Figure 3:
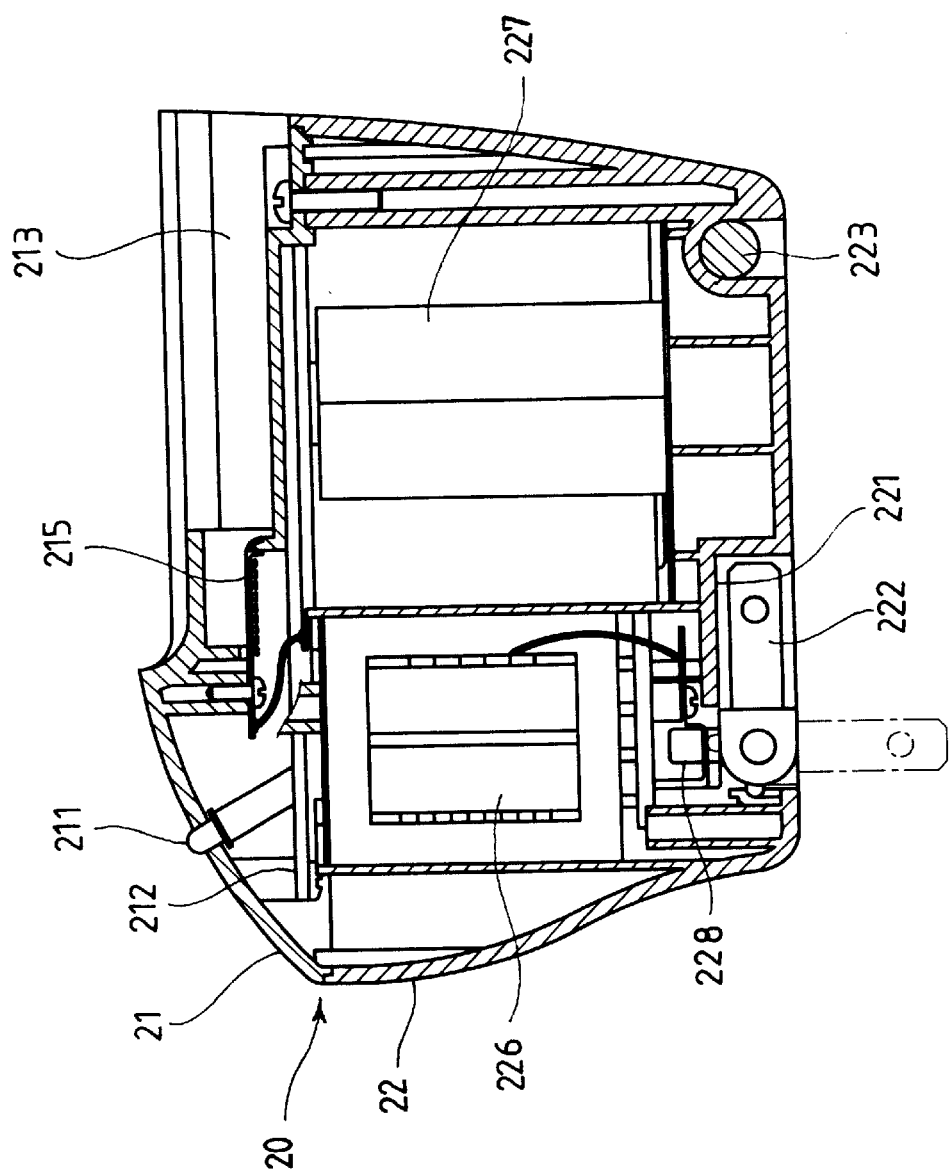
FIG. 3 is a cross sectional view to show the interior arrangement of the rechargeable power supply pack of the present invention.
Figure 4:
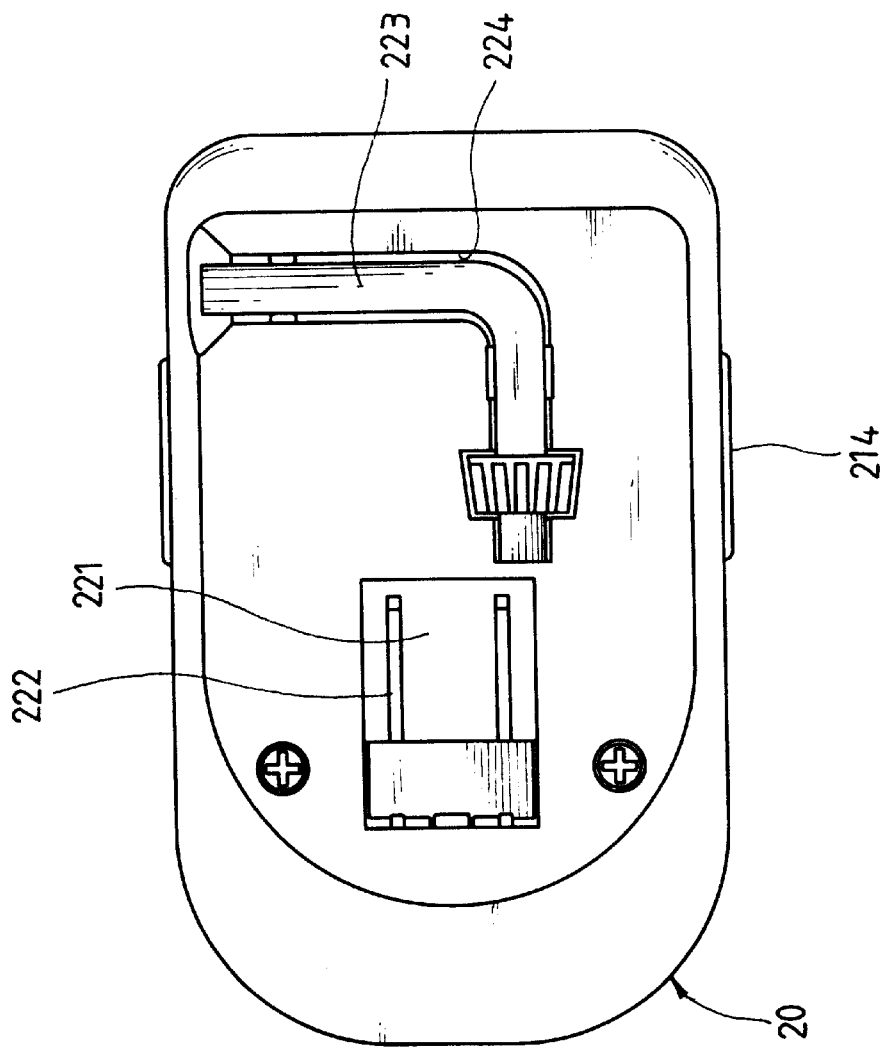
FIG. 4 is a bottom view to show the rechargeable power supply pack.

Referring to FIGS. 1 to 4, the rechargeable power supply pack 20 for hand tools of the present invention comprises a box which is composed of a base 22 and a cap 21 which is mounted on a top of the base 22. A first recess 213 is defined in a top of the cap 21 for being engaged with an engaging device 14 (see FIG. 4)on a lower end of the handle 11 of the tool 10. An adapter 226 is received in the base 22 and has a first contact port 228 connected thereto. A plurality of rechargeable batteries 227 are received in the base 22 and electrically connected to the adapter 226. A second recess 221 is defined in a bottom of the base 22 and two terminal plates 222 are pivotably received in the second recess 221. The two terminal plates 222 are connected to the first contact port 228 when the terminal plates 222 are pivoted out from the second recess 221. A second contact port 215 is connected to the batteries 227 and located in the first recess 213. A third recess 224 is defined in the bottom of the base 22 and a tool 223 is engaged with the third recess 224. A circuit board 212 is received in the cap 21 and a bulb 211 such as an LED, is connected to the circuit board 212. The bulb 211 is exposed on the top of the cap 21 so as to indicate the charging status. Two clamp members 214 are located on two sides of the base 22 and are used to hold the engaging device 14.

Figure 6:
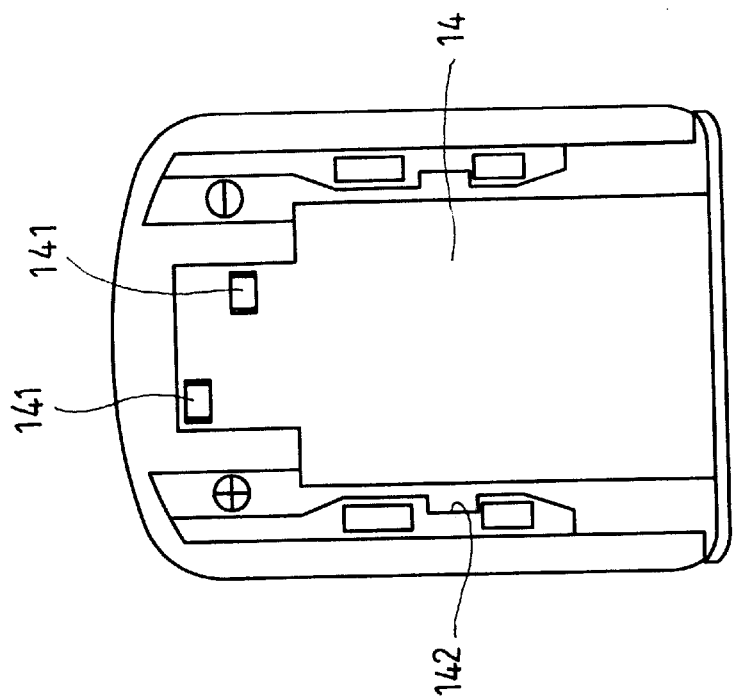
FIG. 6 is a plan view to show two terminals on the engaging device of the tool.
Figure 5:
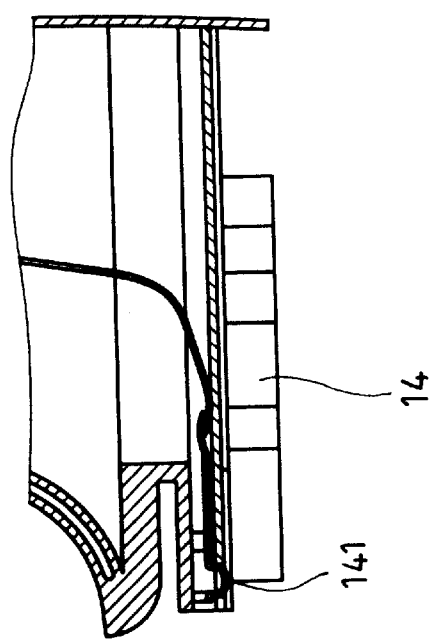
FIG. 5 is a cross sectional view to show the engaging device on the tool.
Figure 7:
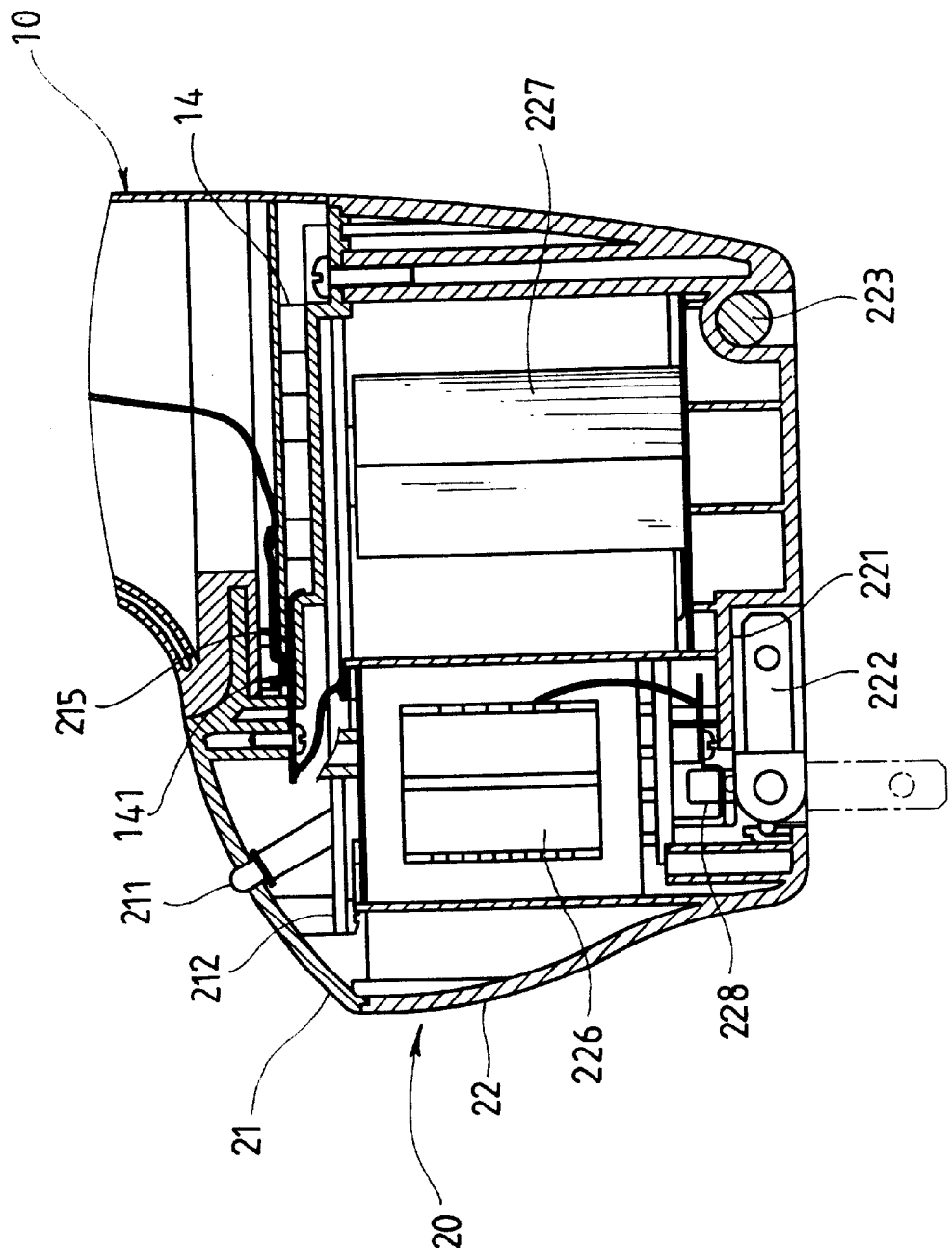
FIG. 7 is a cross sectional view to show the engaging device is engaged with the rechargeable power supply pack.
Figure 8A:
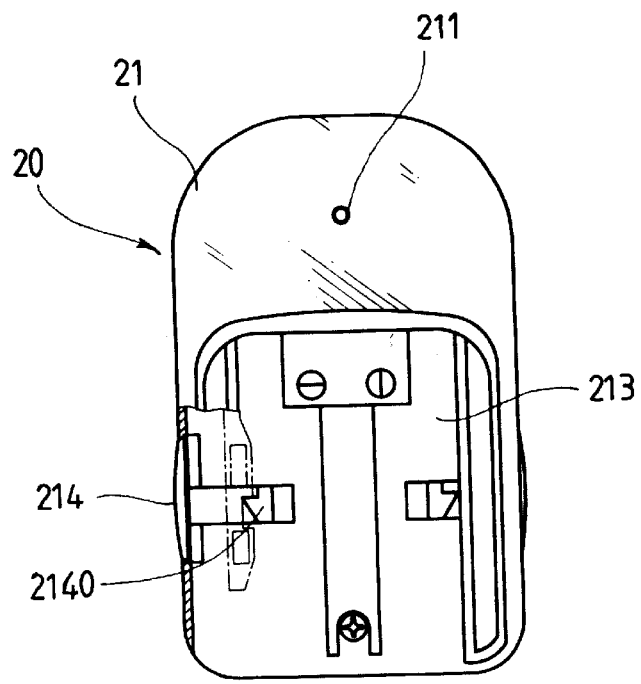
FIGS. 8A and 8B show how the engaging device is engaged with the rechargeable power supply pack.
Figure 8B:
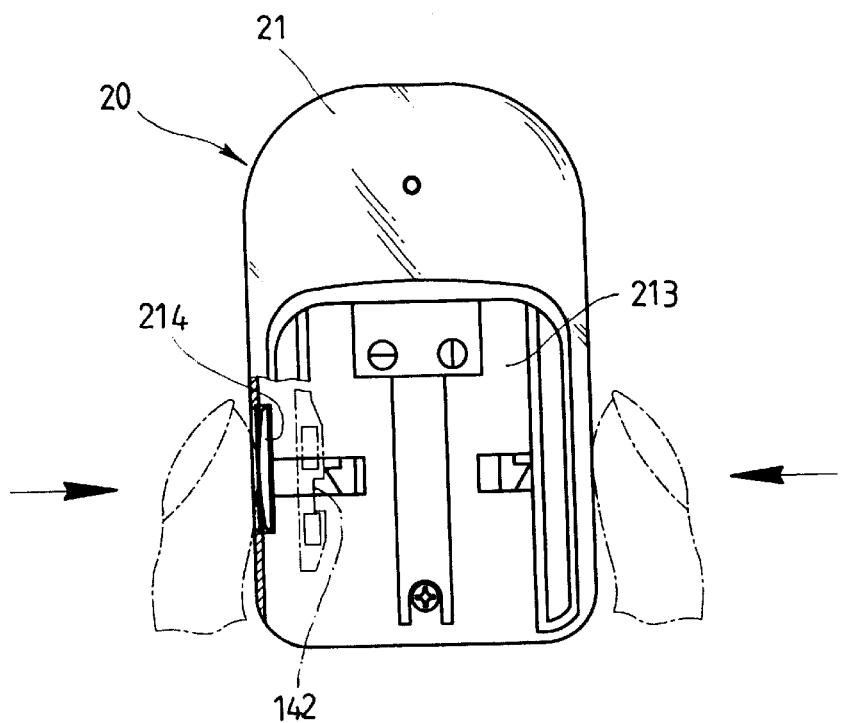

As shown in FIGS. 5–7, 8A and 8B, the engaging device 14 has two flanges so as to be engaged with two slots in the cap 21 and two terminals 141 are located on the engaging device 14. When the engaging device 14 is engaged with the pack 20, the two clamp members 214 are pushed outward by the two corresponding engaging recesses 142 in the engaging device 14 and the two hooks 2140 of the two clamp members 214 are engaged with the engaging recesses 142 after the cap 14 is pushed to its position, and the terminals 141 are in contact with the second contact port 215 of the batteries 227 so that the electric power is transferred to the tool 10. When pressing the clamp members 214, the two clamp members 214 are pushed to disengage the two respective hooks 2140 of the two clamp members 214 from the corresponding engaging recesses 142 in the engaging device 14 so that the engaging device 14 can be disengaged from the pack 20 easily.

The rechargeable power supply pack 20 can be charged directly on the wall without using cables and extra adapters so that it is convenient for the users to recharge the pack 20 and to carry the pack 20.

While we have shown and described the embodiment in accordance with the present invention, it should be clear to those skilled in the art that further embodiments may be made without departing from the scope of the present invention.

What is claimed is:

1. A rechargeable power supply pack for hand tools, comprising:

a box having a first recess defined in a top thereof for being adapted to be engaged with the tools, an adapter received in said box and having a first contact port connected thereto, a plurality of rechargeable batteries received in said box and electrically connected to said adapter, a second recess defined in a bottom of said box and two terminal plates pivotably received in said second recess, said two terminal plates connected to said first contact port when said terminal plates are pivoted out from said second recess, a second contact port connected to said batteries and located in said first recess.

2. The rechargeable power supply pack as claimed in claim 1 further comprising a third recess defined in said bottom of said box and a tool engaged with said third recess.

3. The rechargeable power supply pack as claimed in claim 1 further comprising a circuit board in said box and a bulb connected to said circuit board, said bulb exposed on said top of said box.

* * * * *